B. ROSS.
DUST COLLECTOR.
APPLICATION FILED JAN. 23, 1917.

1,316,924.  Patented Sept. 23, 1919.
4 SHEETS—SHEET 1.

Inventor.
Barton Ross,
by Wilhelm & Parker.
Attorneys.

B. ROSS.
DUST COLLECTOR.
APPLICATION FILED JAN. 23, 1917.

1,316,924.

Patented Sept. 23, 1919.
4 SHEETS—SHEET 2.

Inventor.
Barton Ross,
By Wilhelm & Parker.
Attorneys.

Inventor.
Bartow Ross,
By Wilhelm & Parker,
Attorneys.

UNITED STATES PATENT OFFICE.

BARTON ROSS, OF BUFFALO, NEW YORK.

DUST-COLLECTOR.

1,316,924.  Specification of Letters Patent.  Patented Sept. 23, 1919.

Application filed January 23, 1917. Serial No. 143,892.

*To all whom it may concern:*

Be it known that I, BARTON ROSS, a citizen of the United States, residing at Buffalo, in the county of Erie and State of New York, have invented a new and useful Improvement in Dust-Collectors, of which the following is a specification.

This invention relates to improvements in dust collectors or separators of the kind employing tubes or stockings of fabric or analogous material which retain the dust or impurities and permit the pure air to pass through the meshes of the fabric.

The objects of the invention are to provide a collector of this kind with means of improved construction for removing the dust from the tubes without interfering with the continuous operation of the collector; also to so construct the collector that a part of the tubes may be removed from the collector for repairs or other purposes without interfering with the continuous operation of the collector; also to so mount each group or section of tubes in the collector casing as to permit it to be readily removed therefrom; also to provide means of improved construction for removing the dust from the apparatus; also to provide means for removing the dust from the tubes without permitting any part of the dust to be again taken up by the current of air passing through the apparatus; also to provide automatic mechanism of improved construction for moving the shaking and dust removing devices from one section of the collector to another; also to improve the construction of apparatus of this kind in other respects hereinafter specified.

Briefly stated, the dust collector shown in the drawings is organized as follows:

The stationary frame of the collector is divided into three compartments, the first compartment receiving the dust laden air, the second compartment containing the fabric tubes or stockings, and the third compartment receiving the purified air. The compartment containing the tubes is subdivided into a plurality of sectional compartments, each separated from the others by air tight partitions and each containing a group or section of tubes which may be removed from the apparatus independently of the other tubes and without interfering with the operation of the dust collector. The means for cleaning or removing the dust from the stockings include a shaking mechanism for shaking one group of stockings at a time, means for entirely disconnecting a section of the apparatus containing the group of stockings which is being shaken from the current of air passing through the dust collector, and means for receiving the dust from the stockings and removing the same from the collector. The shaking mechanism, the means for disconnecting a section of the collector from the current of air passing through the collector, and the means for removing the dust from the collector are automatically advanced from one group of stockings to the next so that the removal of dust from the tubes may be accomplished automatically and continuously while the machine is in operation.

The stationary frame of the machine includes a lower horizontal partition $a$ and a spider or partition frame $a'$, forming with an annular wall $a^2$ a chamber A into which the dust laden air enters, and two upper horizontal walls or partitions $a^3$ $a^4$ connected by an annular wall $a^5$ and forming an upper chamber A' for the purified air. The space between the horizontal partition frame $a'$ and partition $a^4$ is divided by means of radial walls $a^6$ into a plurality of sectional compartments A², each of which contains a group of tubes. The radial walls $a^6$ serve to separate the sectional compartments from each other, and each of the sectional compartments is provided with a segmental outer wall $a^7$ which is removably secured to the radial wall $a^6$ in such a way as to form a substantially air-tight closure for the sectional compartment and so as to be readily removable when it is desired to obtain access to a sectional compartment. Any suitable means may be employed for retaining the segmental walls in place, suitable latches $a^8$ being shown in the construction illustrated. The annular walls $a^2$ and $a^5$ are also preferably constructed in sections which are removable from the frame of the machine to afford access to the compartments A and A'.

The dust laden air enters the collector through an opening $a^9$ in the annular wall $a^2$ and the purified air passes out of the collectors through a discharge opening $a^{10}$ in the annular wall $a^5$. The discharge opening $a^{10}$ is preferably connected with a suitable exhaust device, not shown, so that the air is drawn through the tubes by suction. Any other arrangement of the several compartments with regard to each other may be employed if desired.

Each of the sectional compartments contains a dust collecting device, which, in the construction shown, consists of a group of tubes B preferably made of cloth or other fabric. The tubes of each group are secured at their lower ends to a securing member or plate $b$ having perforations through which the ends of the tubes extend. The upper ends of the tubes are secured to an upper securing member or plate $b'$ similar in construction to the lower board $b$ and the upper ends of the tubes are closed by means of a plate $b^2$ secured to the upper face of the plate $b'$. The lower securing member or plate $b$ is removably held against the upper face of the horizontal partition frame $a'$ by means of cleats or the like $b^3$ secured to the radial walls $a^6$ in such a manner that this plate can be easily removed from the segmental compartment by drawing the plate outwardly out of engagement with the cleats $b^3$. The upper plates $b'$ and $b^2$ of a group of tubes are removably secured to a spider $b^4$ by any suitable means, such as thumb screws $b^5$ or the like. The spider is connected to an upright rod or stem $b^6$ which extends upwardly through the horizontal partition walls $a^3$ $a^4$ and is normally held in its upper position by means of a spring $b^7$. The dust laden air from the compartment enters into the tubes through segmental openings $b^8$ in the horizontal partition frame $a'$, one of these openings being provided for each compartment. The air passes through the tubes B leaving the dust in the tubes, and then passes upwardly through holes or openings $b^9$ in the plates $b'$ and $b^2$ or through the spaces between the sides of the plates $b'$ and $b^2$ and the partition walls $a^6$ to openings $b^{10}$ in the horizontal partition $a^4$. The purified air then passes through the compartment A' out of the dust collector. By means of the arrangement of the groups of tubes described, a group may easily be removed from the collector by disconnecting the upper plates of the group from the spider $b^4$ and then sliding the lower plate $b$ radially out of engagement with the cleats $b^3$.

Figure 11:
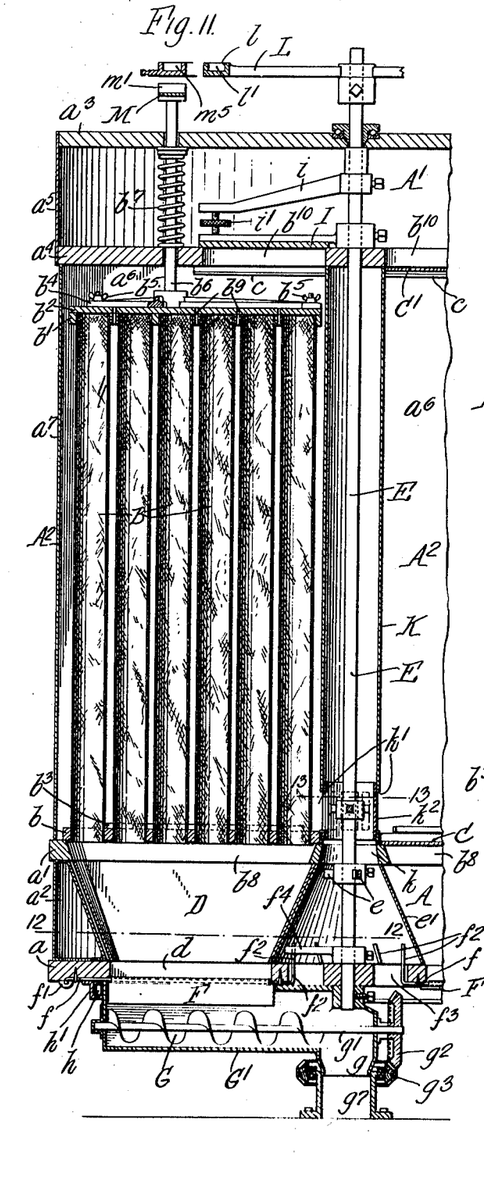
Fig. 11 is a fragmentary sectional elevation thereof on an enlarged scale, on line 11—11, Fig. 8.
Figure 12:
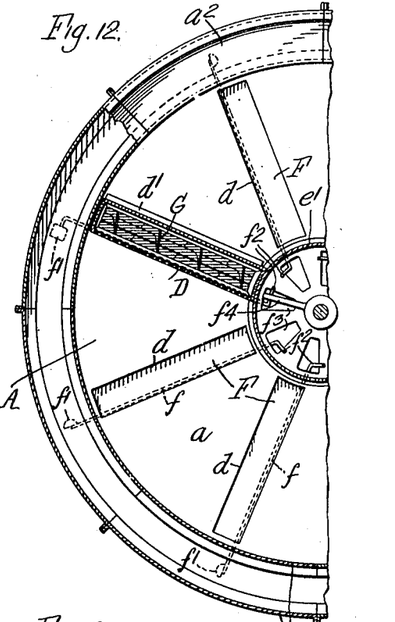
Fig. 12 is a fragmentary sectional plan view on line 12—12, Fig. 11.
Figure 13:
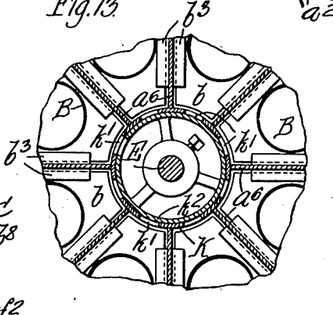
Fig. 13 is a fragmentary sectional plan view thereof on line 13—13, Fig. 11, on an enlarged scale.
Figure 14:
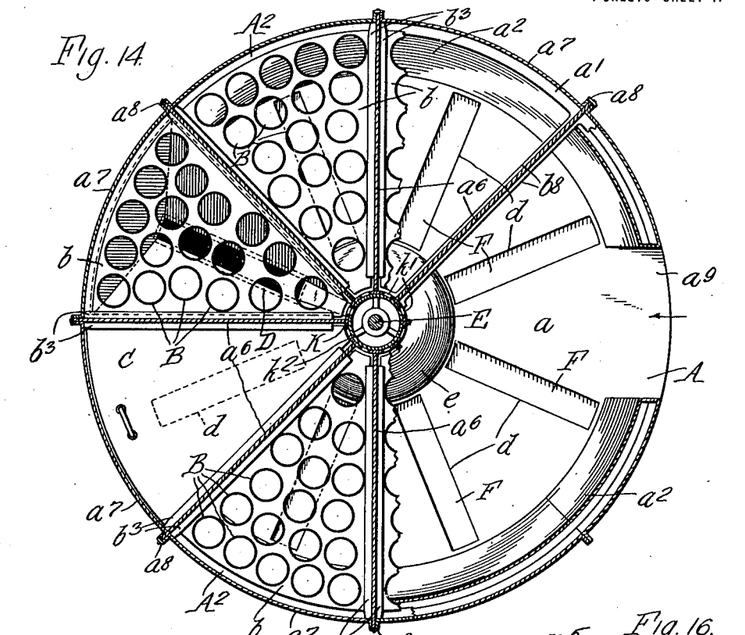
Fig. 14 is a sectional plan view thereof on line 14—14, Fig. 1.
Figures 15, 16, 17:
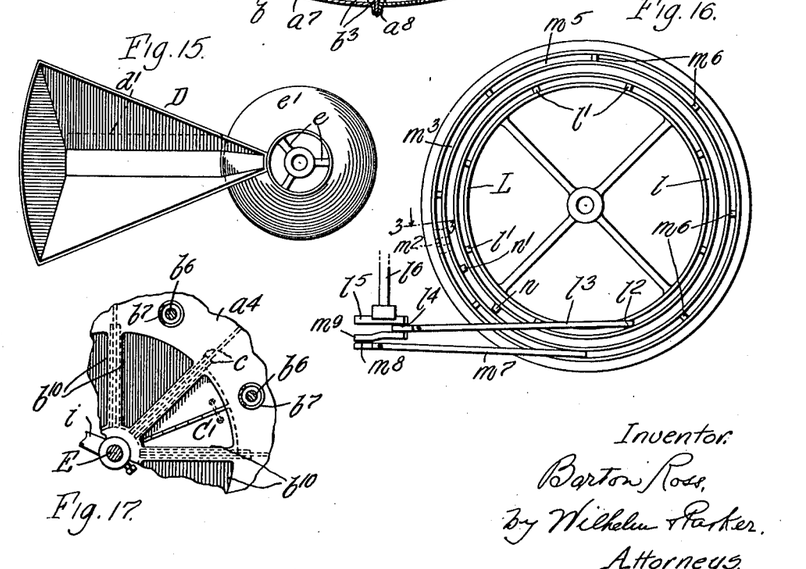
Fig. 15 is a detached top plan view of the dust hopper and a part of the central air tube.
Fig. 16 is a fragmentary top plan view of the dust collector showing the operating mechanism for shaking the tubes and for rotating the vertical shaft of the collector.
Fig. 17 is a fragmentary sectional plan view thereof on line 17—17, Fig. 1, showing the closing device for the air discharge opening of a sectional compartment.

When one of the groups of tubes has been removed from its compartment, the operation of the other parts of the dust collector is in no way interfered with since the opening $b^8$ for the admission of the dust laden air to the tubes can be closed by means of a segmental closing plate C, Figs. 11 and 14, which may be placed into engagement with the cleats or retaining strips $b^3$ in place of the lower securing member or plate $b$ of the group of tubes. The upper discharge opening $b^{10}$ of a sectional or tube compartment may be closed by any suitable means, such, for example, as a closing device or plate C' consisting of two or more sections hinged together so as to permit the plate when folded to be passed between the spider and the upper horizontal partition $a^4$ and to be then unfolded and placed into operative position on supporting cleats or strips $c$, Figs. 11 and 17. When the plates C C' are in position to cover the openings $b^8$ and $b^{10}$ of a sectional compartment, then the compartment is entirely disconnected from the other compartments of the collector and the operation of the other portions of the collector is in no way interfered with. In place of the closing devices C and C', an additional set or group of tubes may be provided with the dust collector which can be inserted in place of a group of tubes removed from the apparatus.

When a group of tubes is shaken by means of mechanism, hereinafter to be described, for the purpose of removing the dust therefrom, the dust falls downwardly through the opening $b^8$ and means are preferably provided to prevent this dust from again entering into the current of air passing through the collector and to remove the dust from the apparatus. In the construction shown for this purpose, a movable dust hopper or passage D is provided which is arranged in the lower compartment A of the dust collector and which is so constructed as to receive the dust passing from the tubes through the opening $b^8$ and to discharge the same at its lower end through a dust discharge port or opening $d$ in the lower horizontal partition $a$ of the dust collector. The hopper D is preferably provided with downwardly inclined sides and is adapted to be intermittently rotated about the axis of the dust collector by means of a central upright shaft E, suitably journaled in the frame of the dust collector, to place the hopper into operative relation to one or another of the sectional compartments of the dust collector. In the construction shown, the operating shaft E is provided at its lower portion with radial arms $e$ to which a conical tube $e'$ is rigidly connected so as to revolve with the shaft, and the hopper D is rigidly secured to the conical tube $e'$. The hopper therefore forms a passage for the dust through the lower compartment A without permitting the dust to be taken up by the air in this compartment. The annular wall $a^2$ is preferably made with a sloping inner wall corresponding with the slope of the outer wall of the hopper. $d'$ represents a scraper preferably secured on the hopper D and adapted to scrape dust collected on the partition $a$ into the openings $d$. Other means for placing the hopper in operative relation to the sectional compartment in which the tubes are being shaken may be provided.

The dust discharge ports $d$ in the horizontal partition $a$ are normally closed by means of valves F secured on rods $f$ pivoted on the partition $a$ and are held closed by means of weights or the like $f'$ arranged on arms of the rods $f$. Each rod $f$ is also provided with an arm $f^2$ extending upwardly through openings $f^3$ in the lower partition plate. These arms are adapted to be actuated by means of a finger or projection $f^4$ secured on and rotatable with the shaft E, in such a manner as to open a valve F when the hopper D is in operative relation thereto. When the projection $f^4$ moves out of engagement with the arm $f^2$ the weight $f'$ returns the valve F to its closed position. Other means for opening the ports or openings $d$ to permit the dust to discharge from the collector, and for closing the ports when the hopper moves out of operative relation thereto may be provided.

Figures 1, 2, 3, 4, 5:
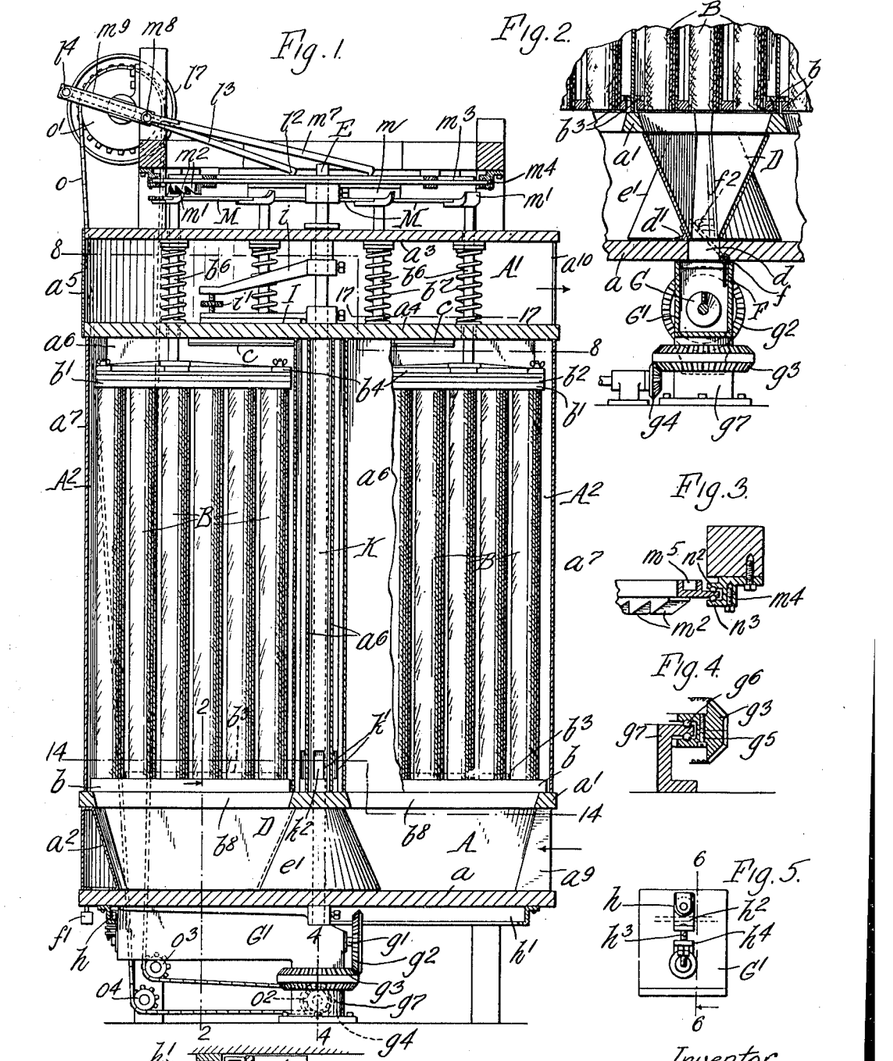
Figure 1 is a central sectional elevation of a dust collector embodying the invention.
Fig. 2 is a fragmentary sectional elevation thereof, on an enlarged scale, on line 2—2 Fig. 1.
Fig. 3 is a fragmentary sectional elevation thereof on line 3—3, Fig. 16, showing the bearing for the shaking device for the tubes.
Fig. 4 is a fragmentary sectional elevation thereof on line 4—4, Fig. 1.
Figs. 5 and 6 are respectively an end elevation and a longitudinal sectional elevation of the rotary conveyer box.

Suitable means may be provided for receiving the dust when the same has been discharged through the port $d$. In the construction shown for this purpose a conveyer G is arranged in a rotatable conveyer housing G' secured to the lower end of the shaft E and adapted to be intermittently rotated with the hopper D into operative relation to the compartment in which the tubes are to be shaken. The conveyer casing shown is mounted below the lower partition A and is provided with a discharge opening $g$ arranged centrally with regard to the collector into which the dust received by the conveyer housing is discharged by means of the conveyer G. The conveyer G, in the construction shown, consists of a spiral screw arranged on a shaft $g'$ which is journaled at its opposite ends in the conveyer housing. The shaft $g'$ is provided at its inner end with a bevel gear $g^2$ meshing with an annular bevel gear $g^3$ which is driven by means of a bevel gear $g^4$. The annular bevel gear $g^3$ is preferably constructed in two halves, as shown in Fig. 4, the two halves being secured together by means of bolts $g^5$ or other suitable means, and ball bearings $g^6$ are provided between an outwardly extending flange $g^7$ and the dust discharge spout of the collector and the annular bevel gear. Any other suitable means for driving the conveyer G may be employed if desired, the arrangement of the annular bevel gear on the dust discharge spout shown in the drawings however serves as a convenient drive for the conveyer and also permits the dust to be effectively removed from the collector.

Figure 6:
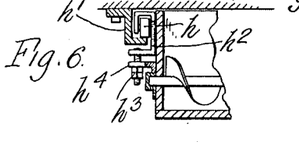
Figure 7:
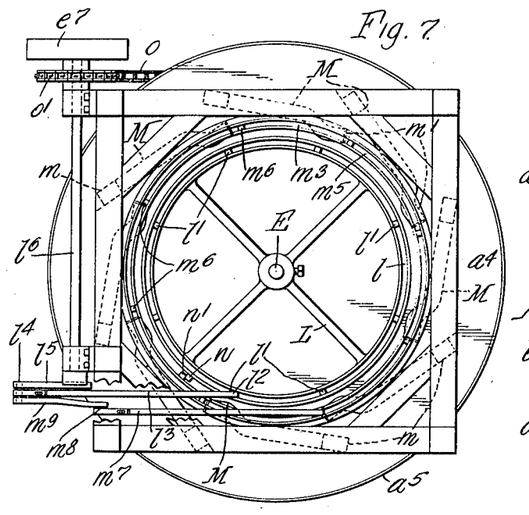
Fig. 7 is a top plan view of the dust collector, partly broken away.
Figure 8:
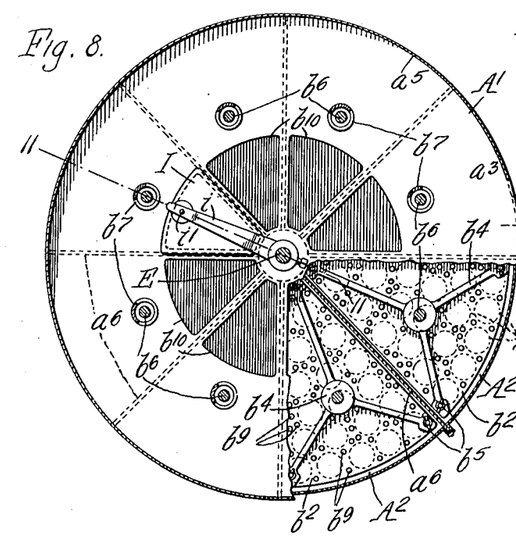
Fig. 8 is a sectional plan view thereof on line 8—8, Fig. 1.

The outer portion of the conveyer housing is provided with a roller $h$ riding on an annular track $h'$ secured on the lower partition $a$. The roller $h$ is preferably mounted on a bracket $h^2$ which is adjustably secured on the casing G' of the conveyer, Figs. 5 and 6, and which is adjustable by means of a bolt and nut $h^3$ engaging the bracket $h^2$ and a bracket $h^4$ secured on the conveyer housing, for adjusting the position of the conveyer housing with reference to the bottom partition $a$. In this manner the friction between this plate and the conveyer housing may be varied for preventing the driving gearing for the conveyer from turning the shaft E and for preventing a leakage of dust through the joint between the conveyer housing and the lower partition $a$.

Means are provided for closing the air discharge opening $b^{10}$ of a sectional compartment when the hopper D and the dust conveyer G are in operative relation to the same. For this purpose a valve I is provided in the construction shown which is secured on the central shaft E of the dust collector and rotates with the shaft and with the hopper D and dust conveyer G so that all of these parts coöperate with the same sectional compartment at the same time. In order to insure the proper closing of the valve, an arm $i$ is preferably secured on the central shaft E and presses at its outer end against the outer portion of the valve I, an adjusting screw $i'$ being provided to permit the proper adjustment of the valve with regard to the partition $a^4$. The valve I and the hopper D therefore isolate any sectional compartment in which the tubes are being operated upon from the current of air passing through the collector, so that the dust shaken from the tubes falls freely out of the tubes through the hopper without being in any way interfered with by the current of air passing through the collector and without coming into contact with the current of air.

Means are preferably provided for breaking the suction in the sectional compartment in which the dust is being removed from the tubes. For this purpose a central tube K is provided in the construction shown which is substantially concentric with the shaft E and which communicates at its lower end with the conical tube $e'$ through an opening $k$ in the horizontal partition frame $a'$, so that outside air can pass from below the dust collector into the central tube K. The tube K is provided with an opening or vent $k'$ for each sectional compartment and a valve $k^2$ is secured to the shaft E and is provided with a single port through which air can pass from the tube K into any one of the sectional compartments. The valve is so positioned that the compartment containing the tubes which are being shaken is connected with the central air tube K to break the suction therein. The valve shown is located in the lower portion of the air tube K but may, if desired, be located in any other portion of the tube, or more than one valve may be provided.

The rotating of the central shaft E step by step to place the valves I and K, the hopper D and a dust conveyer G into operative relation to one or another of the sectional compartments may be accomplished by any suitable means, the following mechanism being preferably employed:

A wheel or disk L is rigidly secured on the shaft E and is provided at its outer portion with an annular groove or track $l$ provided with teeth $l'$ corresponding in number to the number of sectional compartments and spaced at regular intervals in the groove or track. The teeth $l'$ are adapted to be engaged by means of a hooked end portion $l^2$ of an arm $l^3$ which is pivoted at $l^4$ on a crank $l^5$ secured on a drive shaft $l^6$ through which power is transmitted to the collector by any suitable means, such as a pulley $l^7$. When the drive shaft $l^6$ is rotated, the hooked end $l^2$ of the arm $l^3$ is moved back and forth in the groove $l$ so as to engage with one of the teeth or notches $l'$ during its rearward movement and to turn the wheel L during its forward movement, to drive the shaft E through a part of a revolution sufficient to move the valves I and $K^2$, the hopper D and the conveyer G from one sectional compartment to another. Any other means for intermittently moving the shaft E may be employed.

Figure 9:
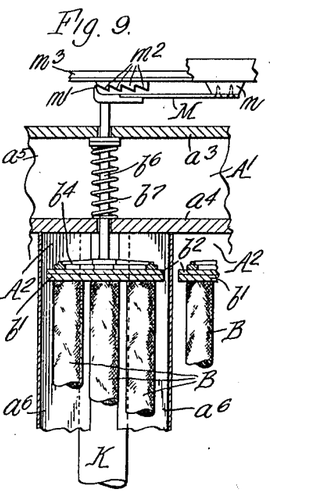
Figs. 9 and 10 are fragmentary sectional elevations thereof showing parts of the shaking mechanism in different positions.
Figure 10:
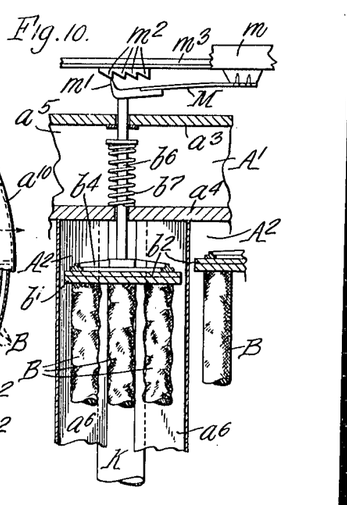

The shaking of the tubes B to remove the dust therefrom is effected in the construction shown by depressing the rod $b^6$ and then releasing the same so as to permit the spring $b^7$ to return the same to its initial position, thus causing the tubes first to become slack, as shown in Fig. 10, and then to be suddenly tightened as shown in Fig. 9. To accomplish the shaking of the tubes, a spring arm M is provided for each of the upright rods $b^6$. The arms M are secured on a part of the frame $m$ and each arm is provided at its end with an upwardly extending tooth $m'$ adapted to be engaged by shaker teeth $m^2$ secured on an annular rotary member $m^3$ which is mounted substantially concentrically with the wheel or disk L in a bearing ring $m^4$ secured on the frame work $m$ of the apparatus. The annular member $m^3$ has a groove $m^5$ similar to the groove $l$ in the wheel or disk L and is provided with teeth $m^6$ adapted to be engaged by the hooked end of a reciprocatory arm $m^7$ which is journaled at $m^8$ on an arm or extension $m^9$ of the crank $l^5$. The rotary member $m^3$ is adapted to be intermittently moved through an arc of a circle by the arm $m^7$ in such a manner as to move the shaker teeth $m^2$ past the tooth $m'$ of the spring arm M to cause the shaking of the tubes as indicated in Figs. 9 and 10. In the construction shown the hooked portion of the arm M moves the member $m^3$ through a comparatively short distance, the greater portion of the movement of the rotary member $m^3$ being accomplished by means of a lug $n$ on the wheel or disk L which engages a corresponding lug or projection $n'$ on the rotary member $m^3$ so that the wheel or disk L moves the rotary member $m^3$ through a part of a revolution during each actuation of the wheel or disk L.

The annular rotary member $m^3$ is preferably journaled in ball bearings, formed by grooves or ball races $n^2$ and $n^3$ in the bearing ring $m^4$ and corresponding ball races in the rotary member, in which the balls are confined.

The bevel gear $g^3$ through which the conveyer B is driven is preferably rotated from the drive shaft $l^6$ by means of a sprocket chain $o$, passing over a sprocket wheel $o'$ secured on the drive shaft $l^6$ and a sprocket wheel $o^2$ secured on the bevel gear $g^4$. Idler sprocket wheels $o^3$ $o^4$ are employed for guiding the sprocket chain.

The dust collector shown has the advantage that any group or section of tubes can be removed from the collector for inspection or repairs while the collector is in operation and without interfering with the continuous operation thereof. The removal of the dust from the tubes is effected in such a way that the dust is removed from the apparatus so that it does not come into contact with the current of air passing through the same, thereby preventing the dust from being again carried into the tubes and increasing the efficiency of the dust collector. By shutting off the compartment containing the tubes being shaken from the rest of the collector, the air current does not in any way interfere with the cleaning of the tubes so that the efficiency of the collector is increased by the thorough cleaning of the tubes. The dust hopper D of the collector need not be absolutely air tight since, if the air is drawn through the separator by suction, a leak in the dust hopper would cause air from the exterior of the apparatus to flow through the tubes in a direction opposite to that in which the air flows when the collector is in operation, thus helping to remove the dust from the tubes. The operation of the collector is entirely automatic and requires no attention while in operation.

I claim as my invention:

1. In a dust collector, the combination of a plurality of dust collecting devices, a casing having a plurality of compartments in which said dust collecting devices are removably arranged, and imperforate plates adapted to be placed in the ends of said compartments for shutting off any of said compartments from the air currents in the collector so that the removal of a dust collecting device from a compartment will not interfere with the operation of other parts of the dust collector.

2. In a dust collector, the combination of a plurality of dust collecting devices, a casing having a plurality of compartments in which said dust collecting devices are arranged, air inlet and air outlet passages in each of said compartments, and imperforate plates adapted to be placed into said inlet and outlet passages of a compartment and which close the passages of a compartment, whereby the removal of a dust collecting device will not interfere with the operation of other parts of a dust collector.

3. In a dust collector, the combination of a plurality of dust collecting devices, a chamber below said devices through which the dust laden air is admitted to said devices, a plurality of openings in the bottom of said chamber, means for normally closing said openings, means for removing dust from one of said devices at a time, a dust chute arranged in said chamber and adapted to be placed into operative relation to the dust collecting device from which the dust is removed, said chute forming a substantially dust-tight passage through said chamber from one of said devices to one of said openings, and means for actuating said closing means to permit dust to be discharged from said chute to said opening when the chute is in operative relation to the opening.

4. In a dust collector, the combination of a plurality of dust collecting devices, a chamber for admitting dust laden air to said devices and arranged below said devices, means for removing dust from said devices, a plurality of dust discharge openings in said chamber each of which is arranged in operative relation to one of said dust collecting devices, a dust chute movable into operative relation to any one of said dust collecting devices and the corresponding opening to form a substantially dust tight passage from said device to said opening, and means for closing said openings when said chute is out of operative relation thereto.

5. In a dust collector, the combination of a plurality of dust collecting devices, a chamber for admitting dust laden air to said devices and arranged below said devices, means for removing dust from said devices, a plurality of dust discharge openings in said chamber each of which is arranged in operative relation to one of said dust collecting devices, a dust chute movable into operative relation to any one of said dust collecting devices and the corresponding opening to form a substantially dust tight passage from said device to said opening, means for closing said openings when said chute is out of operative relation thereto, and a dust conveyer arranged below said chamber and movable with said chute into operative relation to any of said openings to which said chute is in operative relation, to receive the dust.

6. In a dust collector, the combination of a plurality of dust collecting devices arranged about a common axis, means for removing dust from one of said devices at a time, a chamber arranged below said devices and from which dust laden air is admitted to said devices, dust discharge openings in the bottom of said chamber arranged at intervals about said axis, one of said openings being provided for each of said dust collecting devices, a dust chute movable about said axis into operative relation to any one of said devices and forming a substantially dust tight passage through said chamber and connecting any one of said devices with its corresponding opening, and means for closing said openings when said chute is out of operative relation thereto.

7. In a dust collector, the combination of a stationary casing having a plurality of compartments separated from each other by dust-proof partitions, a dust collecting device in each of said compartments, a chamber for the dust laden air arranged below said compartments and having upper openings connecting with said compartments, dust discharge openings in the bottom of said chamber, means for removing dust from said dust collecting device, and a passage which is movable to connect any of said upper openings with a corresponding opening in the bottom of said chamber to conduct dust from a compartment through said dust discharge openings.

8. In a dust collector, the combination of a stationary casing having a plurality of compartments separated from each other by dust-proof partitions, a dust collecting device in each of said compartments, a chamber for the dust laden air arranged below said compartments and having upper openings connecting with said compartments, dust discharge openings in the bottom of said chamber, means for removing dust from said dust collecting device, a passage which is movable adapted to connect any of said upper openings with a corresponding opening in the bottom of said chamber to conduct dust from a compartment through said dust discharge openings, and means below said dust discharge openings for removing the dust from the apparatus.

9. In a dust collector, the combination of a plurality of dust collecting devices, a chamber for admitting dust laden air to said devices, means for shaking said devices to remove the dust therefrom, dust discharge openings in said chamber, and a dust passage movable into operative relation to one or another of said dust collecting devices to receive dust therefrom and for conducting the dust through said chamber to a discharge opening, whereby the dust is kept out of contact with the current of dust laden air entering the collector.

10. In a dust collector, the combination of a plurality of stationary dust collecting devices, a chamber for admitting dust laden air to said devices, dust removing means adapted to operate on one of said devices at a time, dust discharge openings in the bottom of said chamber, and a dust passage movable from one dust collecting device to another and adapted to receive the dust from the device which is being acted upon by the dust removing means and to form a substantially air tight connection between a device and a dust discharge opening to conduct the dust through said chamber to one of said openings, and means moving said dust removing means and said passage into operative relation to any dust collecting device.

11. In a dust collector, the combination of a plurality of stationary dust collecting devices, a chamber for admitting dust laden air to said devices, dust removing means adapted to operate on one of said devices at a time, dust discharge openings in the bottom of said chamber, and a dust passage movable from one dust collecting device to another and adapted to receive the dust from the device which is being acted upon by the dust removing means and to conduct the dust through said chamber to one of said openings and to form a substantially air tight passage through said chamber, means arranged below said chamber adapted to receive the dust and remove the dust from the collector, and means moving said dust removing means, said passage and said dust receiving means into operative relation to any dust collecting device.

12. In a dust collector, the combination of a plurality of stationary dust collecting devices, a chamber for admitting dust laden air to said devices, dust removing means adapted to operate on one of said devices at a time, dust discharge openings in the bottom of said chamber which are normally closed, a dust passage movable from one dust collecting device to another and adapted to receive the dust from the device which is being acted upon by the dust removing means and to form a substantially air tight passage through said chamber to one of said openings, means for opening the dust receiving opening when said passage is in operative relation thereto, and means for moving said passage into operative relation to the dust collecting device which is to be acted upon.

13. In a dust collector, the combination of a plurality of dust collecting devices arranged about a common axis, means for removing dust from one of said devices at a time, a chamber arranged below said devices and from which dust laden air is admitted to said devices, dust discharge openings in the bottom of said chamber arranged at intervals about said axis, one of said openings being provided for each of said dust collecting devices, a dust chute movable about said axis into operative relation to any one of said devices and forming a substantially dust tight passage through said chamber and connecting any one of said devices with its corresponding opening, a dust conveyer movable about said axis with said chute and arranged to move into operative relation to the lower side of said openings to receive the dust discharges through said chute, and means for closing said openings when said chute is out of operative relation thereto.

14. In a dust collector, the combination of a plurality of dust collecting devices arranged about a common axis, means for removing dust from one of said devices at a time, a chamber arranged below said devices and from which dust laden air is admitted to said devices, dust discharge openings in the bottom of said chamber arranged at intervals about said axis, one of said openings being provided for each of said dust collecting devices, a chute movable in said chamber about said axis and adapted to form a substantially dust tight passage connecting any of said dust collecting devices with its corresponding opening, and a dust conveyer arranged below said chamber and movable with said chute into operative relation to one or another of said openings to remove the dust discharged through said chute.

15. In a dust collector, the combination of a plurality of dust collecting devices arranged about a common axis, means for removing dust from one of said devices at a time, a dust conveyer including a casing adapted to receive the dust removed from said devices, means for moving said conveyer casing about said axis from one of said devices to another, an annular track supporting the outer portion of said conveyer casing, and means for adjusting said conveyer relatively to said track to hold said casing in substantially dust tight relation to said devices.

16. In a dust collector, the combination of a casing, a plurality of dust collecting devices arranged in said casing about a common axis, means for removing dust from one of said devices at a time, a dust conveyer including a casing adapted to receive the dust removed from said devices and arranged below the bottom of said collector casing, means for moving the conveyer about said axis from one of said devices to another, an annular track for supporting the outer end of said conveyer casing, and means for adjusting said casing relatively to said track to produce a substantially dust proof connection between said casing and the bottom of said collector.

17. In a dust collector, the combination of a plurality of dust collecting devices, each of said devices comprising one or more tubes of fabric or the like secured at their lower ends to a plate removably held in the dust collector, a plate to which the upper ends of said tubes are connected, a device for shaking the tubes and for holding them in their operative positions, said upper plate being removably secured to said shaking device, and an imperforate plate which may be inserted in place of the plate to which the lower ends of said tubes are secured.

18. In a dust collector, the combination of a plurality of dust collecting devices, each of said devices comprising one or more tubes of fabric or the like secured at their upper and lower ends to plates removably held in said dust collector, means connected with said upper plate for shaking said tubes, and an imperforate plate which is adapted to be inserted in said dust collector in place of said lower plate, whereby the removal of the device from the dust collector will not interfere with the operation of the collector.

19. In a dust collector, the combination of a plurality of dust collecting devices, each of said devices comprising one or more tubes of fabric or the like secured at their upper and lower ends to plates removably held in said dust collector, means connected with said upper plate for shaking said tubes, means for interrupting the flow of air to said devices when the same are being shaken, and an imperforate plate which may be inserted in place of said lower plate while the flow of air to a device is interrupted, whereby a device may be removed from the collector without interrupting the operation thereof.

20. In a dust collector, the combination of a plurality of dust collecting devices, each of said devices comprising one or more tubes of fabric or the like secured at their lower ends to a plate removably held in the dust collector, a plate to which the upper ends of said tubes are connected, and a device for shaking the tubes and for holding them in their operative positions, said upper plate being removably secured to said shaking device.

21. In a dust collector, the combination of a casing having a plurality of compartments, a dust collecting device in each of said compartments, each of said dust collecting devices comprising one or more tubes of fabric or the like, a plate to which the lower ends of said tubes are connected and which is adapted to be removably secured in the bottom of a compartment, a plate to which the upper ends of said tubes are secured, a shaking device for removing dust from said tubes including parts extending into each compartment and which are adapted to support the tubes, and means for removably securing the upper plate of a dust collecting device to said part of the shaking device.

22. In a dust collector, the combination of a casing having a plurality of compartments, a dust collecting device in each of said compartments, each of said dust collecting devices comprising one or more tubes of fabric or the like, means for removably securing the lower ends of said tubes in the bottom of a compartment, a plate to which the upper ends of said tubes are secured, a shaking device including a spider arranged in each of said compartments, and means for removably securing said plate to said spider.

23. In a dust collector, the combination of a casing having a plurality of compartments provided with dust-proof side walls and having each an air inlet and an air outlet, a dust collecting device in each of said compartments, means for shaking said dust collecting device to remove dust therefrom, a vent valve in each of said compartments, and means for preventing air from entering said air inlet, for closing said air outlet and for opening said vent valve in a compartment when said shaking device is in operation.

Witness my hand, this 19th day of January, 1917.

BARTON ROSS.

Witnesses:
F. E. PROCHNOW,
A. L. McGEE.